Sept. 27, 1949.    J. ROBERTS    2,482,873
MULTIPLE VALVE AND PACKING THEREFOR
Filed March 11, 1946
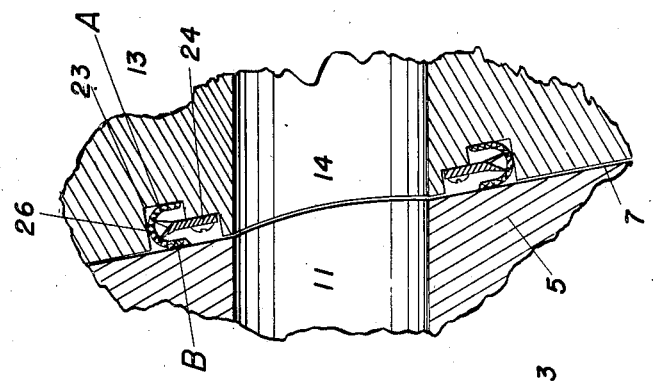
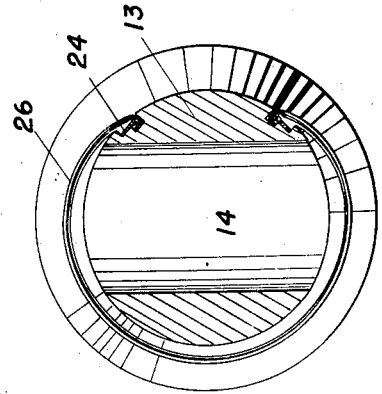
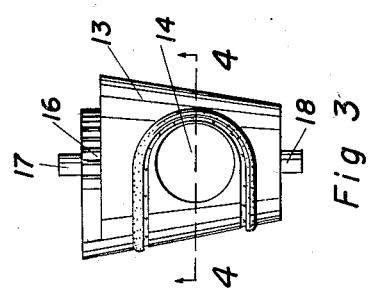
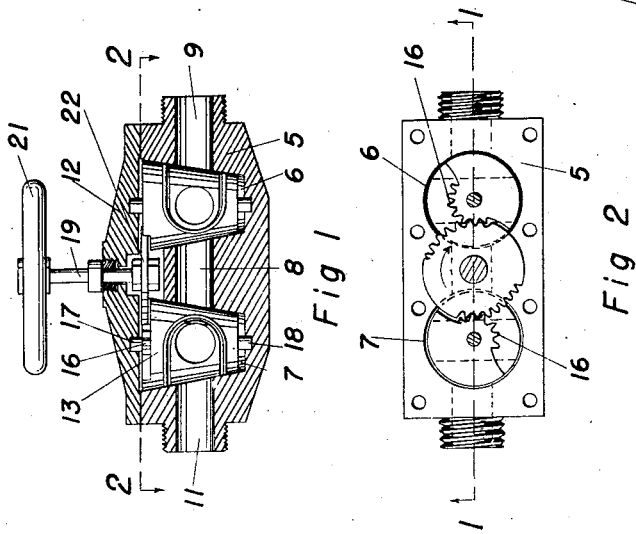
INVENTOR.
John Roberts
BY
Att'y Patented Sept. 27, 1949

2,482,873

UNITED STATES PATENT OFFICE 2,482,873

MULTIPLE VALVE AND PACKING THEREFOR

John Roberts, San Francisco, Calif.

Application March 11, 1946, Serial No. 653,470

2 Claims. (Cl. 251—103)

This invention relates to improvements in valves and has particular reference to a rotary valve, especially adaptable for high pressures.

The principal object of this invention is to provide a valve structure wherein there can be no leakage past the valve through the hydraulic sealing effect of the pressure itself, and entirely eliminating the customary stuffing boxes arranged about the stem of the valve.

A further object is to produce a valve which is economical to manufacture, one which may be readily assembled and one wherein there can be a full flow without any restriction and one wherein the flow may be regulated with a great degree of accuracy.

A further object is to produce a valve which may be easily installed in any pipe line and one which will occupy a minimum amount of space.

Other objects and advantages will be apparent during the course of the following description.

In the accompanying drawings forming a part of this specification and in which like numerals are employed to designate like parts throughout the same, Fig. 1 is a vertical, cross-sectional view taken on the line 1—1 of Fig. 2.

Fig. 2 is a cross-sectional view taken on the line 2—2 of Fig. 1.

Fig. 3 is an enlarged side elevation of one of the valve cocks.

Fig. 4 is an enlarged detailed cross-sectional view taken on the line 4—4 of Fig. 3, and Fig. 5 is an enlarged fragmentary detailed view showing the packing ring and its relation to the cock and valve body.

There are many types of valves, one of which consists of a body in which is a tapered bore, within which is mounted a rotary cock, which when turned in one direction prevents the flow of fluid through said body and when turned to another position permits a free flow through the body.

This type of valve is economical to manufacture, but is not usable for high pressures, and when used for fluids under any appreciable head, packings must be applied, which packings are exceedingly difficult to maintain absolutely tight.

Applicant has devised a cock-type of valve, wherein a packing completely surrounds the two ports in the valve, which packing is further expanded so as to contact the valve and the body to form a seal through the hydraulic pressure effect of the fluid contacting the seal.

In the accompanying drawings wherein for the purpose of illustration is shown a preferred embodiment of my invention, the numeral 5 designates a valve body in which are formed valve-seats 6 and 7, which seats are connected by a bore 8, and with the outside by bores 9 and 11.

A cover-plate is shown at 12. In each of the seats is positioned a rotary-cock, or valve 13, and as both of these valves are identical, but one will be described.

Referring now to Fig. 3, it will be noted that the valve 13 has a port 14 extending therethrough, and a mutilated gear 16 formed upon its upper surface and stub shafts 17 and 18 formed upon its upper and lower surfaces respectively.

Extending through the cover 12 is a valve-stem 19 which may be rotated by a handle 21 so as to rotate a gear 22 which meshes with the two mutilated gears on the two valves.

The result of the construction thus far described is that when the handle 21 is rotated in a clockwise direction from that shown in Fig. 2, then the gear 22 will cause the gears 16 to both move in a counterclockwise direction so that it will line up the ports 14 in each of the valves with the bores 8, 9 and 11 in the body 5.

Referring now to Figs. 3, 4 and 5, it will be noted that I have formed in each of the valves an elliptical channel 23, which channel is so located that it extends around one end of the port, thence around the side of the body and around the other end of the port.

Within this channel I mount a retainer 24, which serves to hold an expansible packing ring 26. This ring is semi-circular in cross section, so that a portion thereof will bear against the valve, as shown at A, and a portion will bear against the body, as shown at B; therefore, any leakage from the pressure side will tend to force this packing outwardly and cause a hydraulic seal, past which no fluid can flow. This type of seal is well known and needs no further description.

It will, therefore, be apparent that when the valves are in the position of Fig. 1 and pressure is coming from either the right or the left bore 11 or 9, that when the pressure contacts the valve and tends to escape outwardly between the valve and the body, it will enter the channel 23 and come into contact with the packing 26, thus forcing the same against the valve and the body and effect a perfect seal.

Further, there will be no tendency of the valve to raise in its seat, as the pressure downwardly against the bottom portion of the packing will be equal to that against the top portion of the packing and a balanced condition will exist.

It will be apparent also that my valve will work equally well, irrespective of the direction of the flow of liquid therethrough.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a valve, a rotary valve member having a fluid passage therethrough, said valve member having a groove provided with portions extending semicircularly about the ends of said passage and portions connecting said semicircular portions and extending circumferentially about said member, and an inwardly facing U-shaped packing strip extending entirely throughout said groove.

2. In a valve, a rotary valve member having a fluid passage therethrough, said valve member having a groove provided with portions extending semicircularly about the ends of said passage and portions connecting said semicircular portions and extending circumferentially about said member, said groove having a deep portion relatively remote from said passage and a relatively shallow portion, an inwardly facing U-shaped packing strip extending entirely throughout the deep portion of said groove, and a retaining annulus held in the shallow portion of said groove and having its outer edge portion extending between the sides of said strip.

JOHN ROBERTS.

REFERENCES CITED

The following references are of record in the file of this patent:

UNITED STATES PATENTS

| Number | Name | Date |
|---|---|---|
| 2,392,319 | Harwood | Jan. 8, 1946 |

FOREIGN PATENTS

| Number | Country | Date |
|---|---|---|
| 566,675 | France | Dec. 25, 1923 |